United States Patent
Lavin et al.

[19]

[11] Patent Number: 6,155,260
[45] Date of Patent: *Dec. 5, 2000

[54] CONTINUOUS CARE TREATMENT PLATFORMS AND SYSTEMS OF USE

[75] Inventors: Gregory C. Lavin; Craig A. Young, both of Geneva, N.Y.

[73] Assignee: Theradynamics Corporation, Geneva, N.Y.

[*] Notice: This patent is subject to a terminal disclaimer.

[21] Appl. No.: 09/133,980

[22] Filed: Aug. 14, 1998

Related U.S. Application Data

[60] Continuation-in-part of application No. 09/047,043, Mar. 24, 1998, which is a division of application No. 08/838,465, Apr. 7, 1997, Pat. No. 5,755,479, which is a continuation of application No. 08/397,402, Mar. 2, 1995, abandoned.
[60] Provisional application No. 60/055,839, Aug. 15, 1997.

[51] Int. Cl.$^7$ ..................................................... A61G 15/00
[52] U.S. Cl. ........................... 128/845; 128/869; 128/870
[58] Field of Search .................................... 128/845, 846, 128/869, 870; 5/508; 296/19

[56] References Cited

U.S. PATENT DOCUMENTS

| | | |
|---|---|---|
| 2,370,402 | 2/1945 | Gutman . |
| 2,464,923 | 3/1949 | Davis . |
| 3,462,892 | 8/1969 | Meyer . |
| 3,509,810 | 5/1970 | Riester . |
| 3,514,794 | 6/1970 | Pofferi . |
| 3,567,273 | 3/1971 | Haas . |
| 3,660,591 | 5/1972 | Schultz et al. . |
| 3,699,235 | 10/1972 | Wasson et al. . |
| 3,711,664 | 1/1973 | Benoit et al. . |
| 3,921,345 | 11/1975 | Damico . |
| 4,181,347 | 1/1980 | Clark . |
| 4,352,991 | 10/1982 | Kaufman . |
| 4,550,946 | 11/1985 | Hanemaayer . |
| 4,557,453 | 12/1985 | McCloskey . |
| 4,570,733 | 2/1986 | Star . |
| 4,581,986 | 4/1986 | Conklin et al. . |
| 4,584,989 | 4/1986 | Stith . |
| 4,646,211 | 2/1987 | Gallant et al. . |

(List continued on next page.)

FOREIGN PATENT DOCUMENTS

| | | |
|---|---|---|
| 0219469 | 4/1987 | European Pat. Off. . |
| 773352 | 11/1934 | France . |
| 1366174 | 6/1964 | France . |
| 2417294 | 9/1979 | France . |
| 1178550 | 9/1964 | Germany . |
| 2421693 | 11/1975 | Germany . |
| 3422022 | 12/1985 | Germany . |
| 602756 | 3/1960 | Italy . |
| 1049235 | 11/1966 | United Kingdom . |
| 2078626 | 1/1982 | United Kingdom . |

OTHER PUBLICATIONS

Diamond III and Diss III Gas Service Outlets for Hospital Piping Systems, Ohio/Diamond III, Diss III Service Outlets Catalog, Ohio Medical Products, 8 pages.

Miscellaneous Information Sheets From Fairfield Medical Products Corporation, 6 pages.

(List continued on next page.)

*Primary Examiner*—Michael A. Brown
*Attorney, Agent, or Firm*—Eugene Stephens & Associates

[57] ABSTRACT

A continuous care treatment platform includes a first service junction at a head end and a second service junction at a foot end. The first service junction delivers physiological surfaces to a patient supported by medically related utilities available from either an onboard supply or an offboard supply through the input service junction. An umbilicus, which includes a bundle of lines for conveying the utilities, has a first head end that connects to any of a plurality of standardized offboard service junctions and a second end that connects to the second onboard service junction at the foot of the platform. The standardized offboard service junctions make available larger quantities of the medical utilities. Continuous care is maintained by switching between the onboard supplies and offboard supplies available through the umbilicus.

44 Claims, 5 Drawing Sheets

U.S. PATENT DOCUMENTS

| | | |
|---|---|---|
| 4,680,790 | 7/1987 | Packard . |
| 4,691,397 | 9/1987 | Netzer . |
| 4,768,241 | 9/1988 | Beney . |
| 4,842,224 | 6/1989 | Cohen . |
| 4,858,256 | 8/1989 | Shankman . |
| 4,915,435 | 4/1990 | Levine . |
| 4,957,121 | 9/1990 | Icenogle et al. . |
| 5,072,906 | 12/1991 | Foster . |
| 5,149,036 | 9/1992 | Sheehan . |
| 5,186,337 | 2/1993 | Foster et al. . |
| 5,236,390 | 8/1993 | Young . |
| 5,327,600 | 7/1994 | Hoogendoorn . |
| 5,755,479 | 5/1998 | Lavin et al. . |

OTHER PUBLICATIONS

The Fairfield Horizontal Rail/Headwall System Brochure, Fairfield Medical Products Corporation, 1989, 6 pages.

Arcitectural Specifications, Fairfield Medical Rail Systems Brochure, Fairfield Medical Products Corporation, 5 pages, Nov. 1991.

Hill–Rom Brochure, "First Impression Series", Copyright 1991.

Medical Gas Rail Specifications, Fairfield Medical Products Corporation Brochure, Mar. 1992, 4 pages.

Life–Support Cocoon Advertisement, Popular Science, Feb. 1995, 1 page.

Ohio Medical Products, Diamond III and Diss III Gas Service Outlets for hospital piping systems, catalog, 8 pages.

Fairfield Medical Products Corporation, Architectural Specifications for Fairfield Medical Rail Systems, information sheet, 5 pages.

Fairfield Medical Products Corporation, Specifications for Medical Gas Rail, information sheet, 4 pages.

Fairfield Medical Products Corporation, The Fairfield Horizontal Rail/Headwall System, brochure, 6 pages.

Fairfield Medical Products Corporation, Fairfield Medical Products Corporation, miscellaneous information sheets, 6 pages.

Hill–Rom, "First Impression Series", copyright 1991, Architectural Specifications, 12 pages.

Litton Life Support, "Technology Solutions Results", May 27, 1998, 14 pages.

Military Medical Technology, Apr./May 1998, vol. 2, Issue 2, Northrop Grumman advertisement for Life Support for Trauma and Transport, 4 pages.

Hewlett Packard, web page Aug. 5, 1998, Information about Viridia, 5 pages.

Pentagram, Friday, Oct. 2, 1998, "New System Allows Treatment of Soldiers in Transit" by James Darcy, Pentagram staff writer, 2 pages.

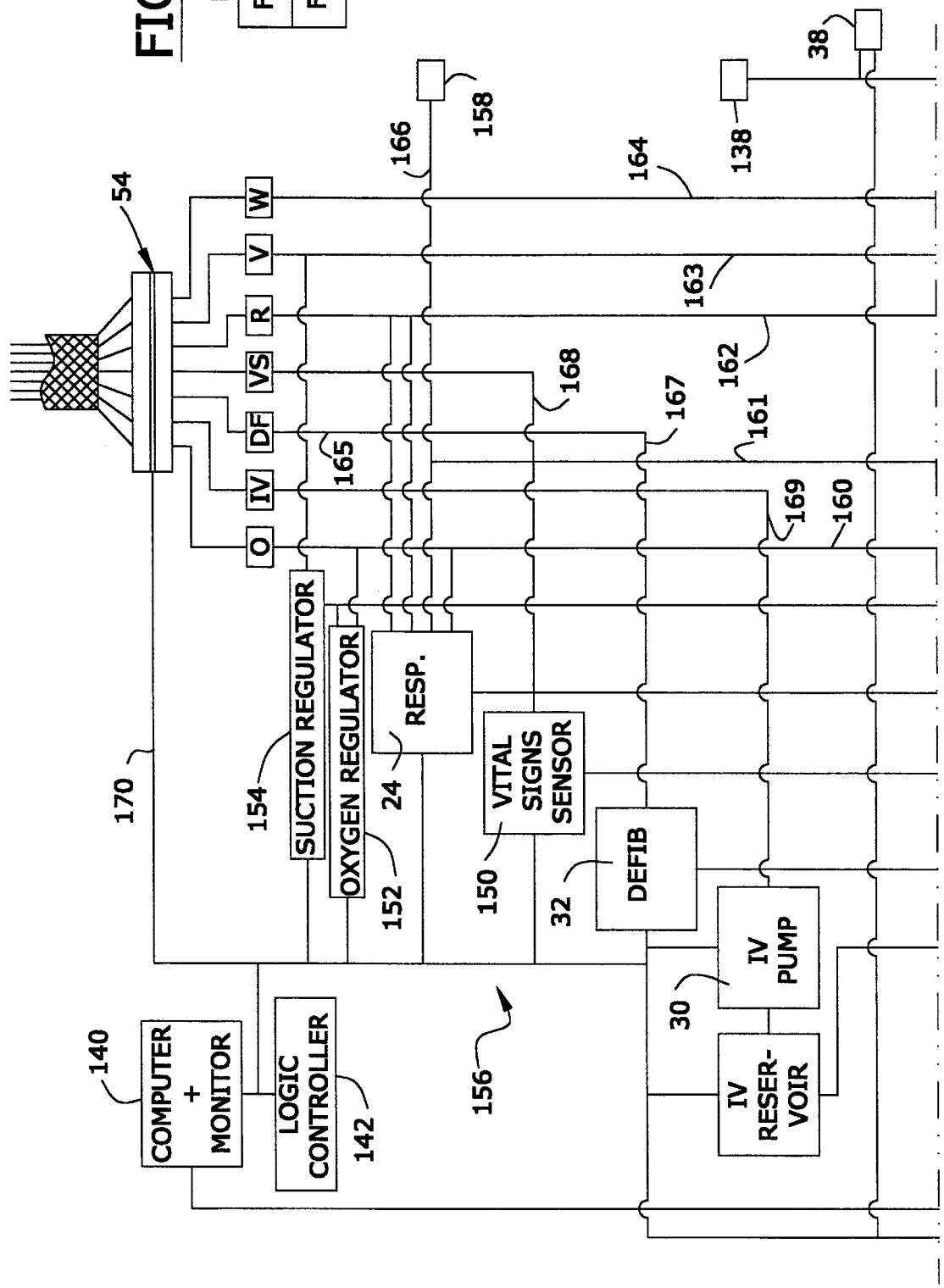

CONTINUOUS CARE TREATMENT PLATFORMS AND SYSTEMS OF USE

RELATED APPLICATIONS

This application is a Continuation-In-Part of copending application Ser. No. 09/047,043 filed Mar. 24, 1998 entitled "Mobile Medical Treatment Platform with Utilities Umbilicus", which is a divisional of application Ser. No. 08/838,465 filed Apr. 7, 1997 entitled "Umbilicus System for Delivering Medical Services", now U.S. Pat. No. 5,755,479, which is a continuation of application Ser. No. 08/397,402 filed under the same title on Mar. 2, 1995, now abandoned, all of which are hereby incorporated by reference. Priority is also claimed to Provisional Application Ser. No. 60/055,839 filed Aug. 15, 1997 entitled "Continuous Care Treatment Platforms and Method of Use", which is also hereby incorporated by reference.

BACKGROUND AND SUMMARY OF INVENTION

An umbilicus system for delivering medical services to mobile treatment platforms is described in our grandparent application, now U.S. Pat. No. 5,755,479. The disclosed umbilicus system establishes a useful, coordinated means of connecting highly capable mobile treatment platforms to a mother vehicle or other mobile source of supply containing medical and support utilities necessary to conduct surgery or perform a wide range of other medical procedures on the treatment platforms.

Prior to the development of a Rapid Deployment Hospital Module (RDHM) described in U.S. Pat. No. 5,236,390 to the second named inventor herein and which is hereby incorporated by reference, mobile hospital unit designs generally replicated existing hospital wall utility configurations and bed and gurney treatment platforms. The wall-only utility configurations of both mobile and fixed hospital units require the extension of multiple medical service lines to the gurneys, exposing the lines to disconnection and limiting access to the patient. Much time and attention are required to connect and disconnect the lines whenever the patient is relocated within or between treatment facilities. Typically, the lines and any mobile services or connections are hand carried, thrown atop the patient surface, or trundled alongside—all of which compromise stop-and-treat capabilities en route. Some services may be missing, and others are not organized to treat en route.

Other treatment discontinuities are precipitated by patient transfers between limited capability or overly specialized platforms, such as between beds, transports, and surgery tables. Typically, these patient platforms waste valuable space within their undercarriages and along their peripheries, requiring patient transfers to support even routine treatment and transport capabilities. The required patient transfers also result in unnecessary duplication of patient platforms and frequent breaks in treatment continuity.

Space, time, and resource limitations in the field provided us with the initial impetus to conceive of a treatment platform that would be modifiable and interchangeable among the RDHM's eight service junctions. By integrating those characteristics common to all hospital patient support devices into a common gurney, we designed a modular, multiple purpose platform capable of serving as emergency/reception, pre-op, surgery, post-op, intensive care, or many other specialties. Each gurney could be quickly configured to a required role and later modified to meet changing demands, optimizing capabilities of medical personnel and providing the focus for organization of the entire medical response.

Our umbilicus system, which bundles utility lines together for single point plug-in capability, opens a complete 360 degree access to the patient when connected overhead. Used in conjunction with onboard utilities, patients served by the umbilicus system are never disconnected from life-sustaining equipment and utilities. The umbilicus distributes utilities, which can include medical gases, electrical power, and communications directly to the gurney's medical equipment, supplanting the onboard utilities which are used for short transport intervals.

While further developing the umbilicus system, we recognized that a common mobile treatment platform could significantly improve patient management within a fixed facility as well. Patients in medical centers are, of necessity, moved from point to point nearly as much as in field settings. One typical example is hospital bed to pre-op to anesthesia to surgery to post-op/recovery to intensive care to hospital bed. Our common treatment platform with umbilicus system can be more flexibly and responsibly deployed throughout medical centers, transforming any predesigned utility service junction into a comprehensive treatment site, as patient flow circumstances dictate. Treatment teams can perform reliably at any bedside, when necessary, and in the meantime be assured that the logistics for monitoring and treating throughout the facility are optimized through commonality and modularity.

The central characteristic of our umbilicus/treatment platform system is a continuous treatment capability. In the field, critically injured patients suffer discontinuity of monitoring and treatment during transport and transfer from gurney to gurney. Vital procedures such as CPR and anesthesia require continuity of utilities, support equipment, and treatment surface during movement. Our gurney/umbilicus system reduces the negative effects of transport, rendering all umbilicus connection points en route common to one another, dependent only upon what additional equipment, specialized personnel, and telemedical data and consultation are available. Thus, the patient can remain with a single platform throughout his tour to and through a care facility as well as between facilities, whether fixed or mobile, and remain assured of prompt, sophisticated attention as needed.

A patient located on a single continuous care mobile treatment platform can travel onboard a modularly assembled unit through the spectrum of care within a fixed medical center. An on-board computer system can contain a complete, constantly updated medical record of the patient, available for review via a monitor located behind the patient's head or at alternate points on the platform. Specific medical and electrical equipment such as respirators, anesthetic machines, suction devices, EKG/defibrillators, blood/fluid infusion modules, and temporary electrical power sources (batteries and chargers) can be located immediately beneath a patient treatment surface. Various medical supplies and the equipment for producing or regulating the supplies can also be located in the space immediately below the treatment surface. These supplies include oxygen, anesthetic gas ($N_2O$), suction, air, and water. Additional equipment can be clamped to side rails.

An onboard valve system selects medical utilities from its onboard supplies or from the umbilicus service junction; such utilities include: the various medical supplies (oxygen, anesthetic gas, air, suction, and water) and electrical power (onboard battery vs. 120 volt AC electric through the umbilicus). The umbilicus can also provide a medical computer/telemedicine link between the onboard computer and offboard computers or other remote telecommunication devices. The utilities are preferably dispensed and monitored from a common service junction located along the platform head. The umbilicus service junction is preferably located at the platform foot to be least obtrusive to patient care activities which predominate at the patient's head area and along both sides of the patient's torso. Also, an extension of the umbilicus from the platform foot to similar access ports located on a ceiling further optimizes patient access by allowing a full circulation of 360 degrees around the patient with greatly reduced risk of any interference with the umbilicus.

Logistic benefits of a common, continuous treatment umbilicus/platform system include greater sharing of medical equipment among medical departments; more accurate, continuous and responsive monitoring of patients whatever their location in the facility; and fewer duplications such as "transport only" gurneys in hallways. Advances in digitization of medical data and in telemedical communication also support the appropriateness of the gurney/umbilicus as the prime focal point of data management, treatment, and monitoring efforts by the health care team. Computer storage of medical records already permits the physician and nurse considerable bedside information as in the examples of computerized Intensive Care EKG records and the military MARC Card and Meditag systems. Full development of this trend, including rapid bedside assay of vital signs, blood, urinalysis, and review of other diagnostic parameters such as digitized x-rays, MRI, and ultrasound images is certain to follow. A precise, quick, and comprehensive medical response requires a platform capable of managing data and providing medical support anywhere the patient is located.

An example of our medical treatment platform includes a main body supporting a treatment surface, onboard medically related utilities, and first and second service junctions. The first service junction includes an array of ports for delivering physiologic services to a patient supported on the treatment surface. The second service junction includes an array of ports grouped together and surrounded by an interlock for detachably securing an umbilicus containing a bundle of lines that convey medically related utilities from an offboard location.

The onboard medically related utilities can include medical supplies, such as medical gases, and a temporary electrical power source. The umbilicus can be arranged to deliver a more sustainable supply of the medical gases and electrical power through the second service junction. Onboard medical equipment, which is preferably modular in nature, can also be supported by the main body; and electrical lines can be used to connect the onboard medical equipment to both the onboard temporary electrical power source and the second service junction.

Supply lines connect the first service junction to both the onboard medical supplies and the second service junction. A switching system alternates delivery of the medical services to the first service junction between the onboard medical supplies and the offboard medical supplies distributed through the second service junction. An onboard controller related to the switching system can be used to regulate delivery of physiologic services through the first service junction to the patient. The controller is preferably related to an onboard computer that monitors operation of the switching system and the onboard equipment; maintains patient records; and governs data handling, analysis, patient status with trending, alarms, and communications. Communication lines within the umbilicus support similar functions from remote locations.

The main body can be divided into a central portion supporting the onboard medically related utilities and head and foot ends relating to the intended orientation of patients. The first service junction is preferably located together with a computer monitor at the head end, and the second service junction is preferably located at the foot end. A group of replaceable service lines are bundled together and connected to the first service junction for delivering a plurality of the physiologic services to patients. The bundling facilitates monitoring of the lines, reduces risk of inadvertent disconnection, and provides for rapid replacement of all the service lines in advance of treating a different patient.

The umbilicus preferably includes a sheath enclosing a bundle of lines which provide all the medical utilities necessary to perform medical and surgical procedures including: various medical gases, suction, air pressure, water, electric power, and medical monitoring/computer system/telemedical communications. The sheath can be reinforced, or a metal safety cable can be included among the bundled lines and connected to a nearby support to protect the other lines from overextension. The umbilicus can be any appropriate length, for example from five to fifteen feet, and can be permanently fixed to either a common supply source or the treatment platform, but is preferably separately attachable to and detachable from both. Standardized service junctions connected to sources of medical utilities and electrical/communications can be located anywhere appropriate, such as in mobile units including helicopters, transport aircraft, ships, or ground vehicles or in fixed facilities such as clinics, hospitals, and medical centers.

An example of our system for delivering medically related utilities to a treatment platform from a plurality of different sites includes a treatment platform having an onboard service junction with an array of ports grouped together for receiving a plurality of medically related utilities. Offboard service junctions, which are located at a number of different sites and are connected to a supply of the medically related utilities, include arrays of ports grouped together for delivering the medically related utilities. At least one umbilicus is used to alternately connect the onboard service junction of the treatment platform to different offboard service junctions. Each umbilicus contains a bundle of lines for conveying the medically related utilities and has a first head end that is engageable with the offboard service junctions for receiving the medically related utilities and a second head end that is engageable with the onboard service junction of the treatment platform for delivering the medically related utilities to the treatment platform. At least one of the first and second head ends is disengageable from one of the service junctions and engageable with another of the service junctions for supplying the same medically related utilities to the treatment platform from more than one site.

For example, the first head end of the umbilicus can be disengaged from the offboard service junction at one site and engaged with the offboard service junction at another site. Alternatively, the second head end of a first umbilicus can be disengaged from the onboard service junction of the treatment platform at one site, and the second head end of a second umbilicus can be engaged with the onboard service junction of the treatment platform at another site.

Preferably, the ports of both the onboard service junctions and the offboard service junctions are each grouped together and surrounded by an interlock. The head ends of the umbilicus engage the interlocks for simultaneously connecting the groups of ports with opposite ends of the bundle of lines within the umbilicus. The umbilicus preferably contains separate lines for conveying medical gases, electrical power, and communications. The offboard service junctions can be located in a common fixed facility, in different facilities, or in mobile transports to or from the facilities. Regardless of location, the offboard service junctions are preferably standardized so that the first head end of the umbilicus is engageable with all of the standardized offboard service junctions.

The system provides the capability to move patients virtually anywhere on a single treatment platform under continuous care and monitoring, whether the supplies and energy resources for providing the care originate from offboard standardized service junctions or onboard sources. The onboard supplies also provide a back-up during power outages and significantly increase the flexibility of fixed or mobile facilities to respond to rapid influxes of patients. Also, the ability to accommodate medical or surgical procedures at any location of the standardized offboard service junctions speeds the delivery of appropriate care and adds more flexibility to treatment locations. Awkward patient transfers between treatment platforms and between treatment locations are reduced. Locating a complete medical history with the patient at all times including times between treatment locations also contributes to the delivery of appropriate medical care any time as needed.

DRAWINGS

DETAILED DESCRIPTION

Figure 1:
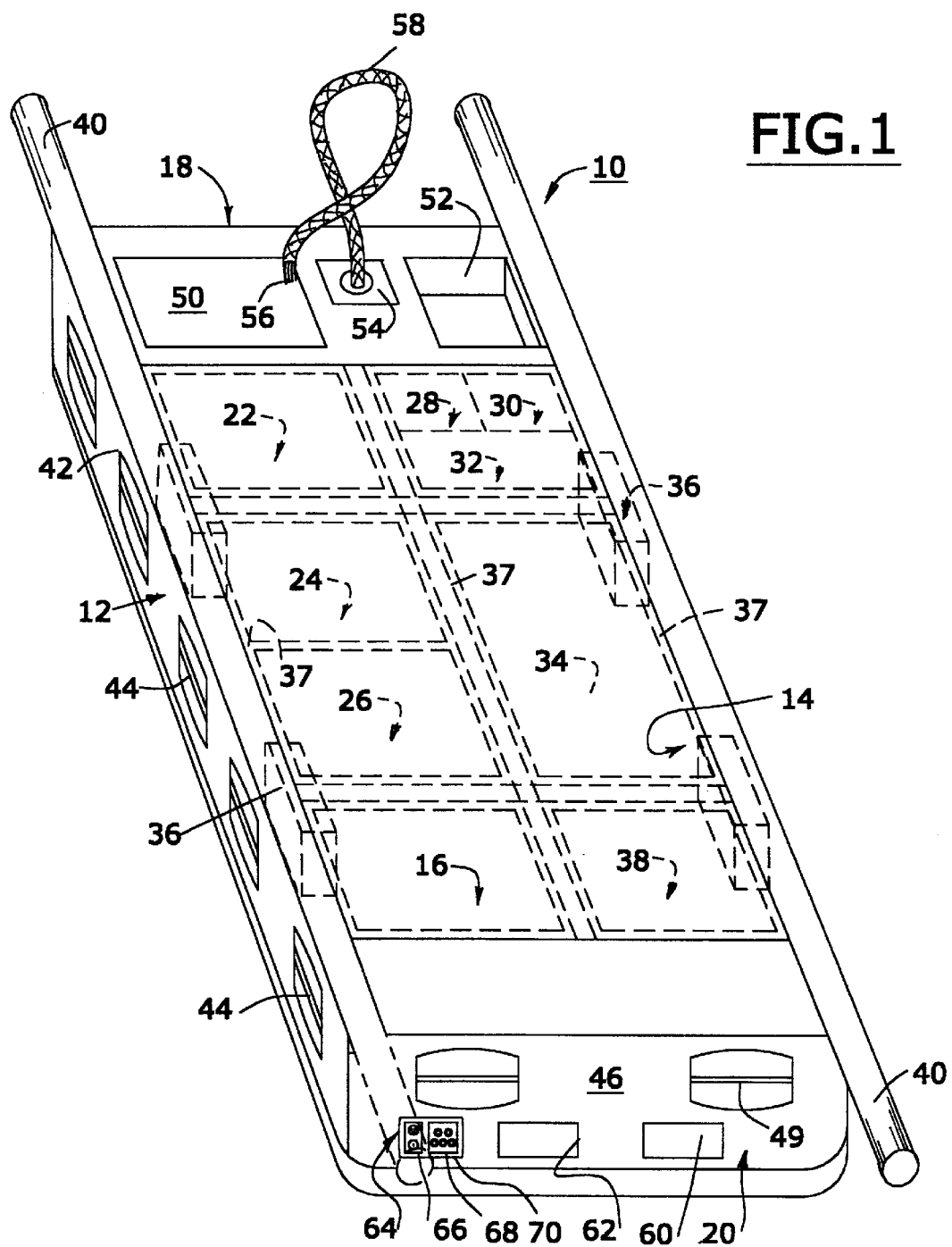
FIG. 1 is a perspective view of a continuous care platform particularly useful as a stabilization and evacuation platform and having onboard equipment and supplies as well as service junctions for receiving and distributing medical utilities.

Medical treatment platforms can take a variety of structural forms in accordance with our invention from gurneys with suspensions and wheels to stetchers with rails for hand carrying. A suitable gurney structure is disclosed in our parent U.S. Pat. No. 5,755,479. FIG. 1 depicts a stabilization and evacuation platform 10 adapted for continuous care. The platform 10 has a main body 12 with a central storage cavity 14 covered by a treatment surface 16 and head and foot ends 18 and 20, which are referenced with respect to the intended orientation of a patient on the treatment surface 16. The main body 12 is preferably a double-walled, vibration-absorbing resin body.

A plurality of modular medical equipment and supplies are mounted in the storage cavity 14. On the patient's right side from head to foot, the storage cavity 14 contains an electronics compartment 22 including a computer, a logic controller, transducers, and regulators; a respirator 24; and a temporary electrical power source 26 including an inverter-charger and batteries. On the patient's left side are suction and IV pumps 28 and 30, a defibrillator 32, and oxygen generation and storage 34. Also mounted within the storage cavity 14 are lateral and vertical traction devices 36 (e.g., NATO stretcher footlock and spreader bars). Internal conduits 37 provide pathways for various tubes and wires that extend to and from the equipment and supplies mounted in the storage cavity 14.

A full service heating grid 38 is incorporated into the treatment surface 16 covering the storage cavity 14. Hand rails 40 supported from side walls 42 extend from both ends 18 and 20 of the main body 12 to provide for lifting and manually transporting the treatment platform 10. Traction-securement-lift bars 44 span recesses in the side walls 42 and in end walls 46 at both ends 18 and 20 of the main body 12. The end walls 46 are longitudinally hinged to provide access to the storage cavity 14 from both ends 18 and 20. For example, at the head end 18, the end wall can be swung open to permit access to personal ID card entry, a suction trap, a blood chemistry analyzer, and alternate anesthesia and oxygen ports. An environmental protection sleeve (not shown) can be secured along edges of the main body 12 beneath the lift bars 44 to enfold the platform 10 with patient zip access.

Nearly flush with the treatment surface 16 at the head end 18 of the main body 12 is a computer monitor and touch control screen 50, an IV well 52, and a service junction 54 containing an array of ports connected to various medical utilities within the treatment platform 10. A plurality of distribution lines 56 are bundled into a yoke 58 at one end near their connection to the service junction 54 but are separated at their opposite ends for servicing different parts of the patient. The distribution lines 56 support a variety of physiologic services including oxygen, IV, defibrillation, vital sign sensing, respiration, suction, water, and communications. The yoke 58 protects the many sensor leads, delivery tubes, and call buttons included within the distribution lines and simplifies tasks of tracking and maintaining the integrity of the lines.

Figure 2:
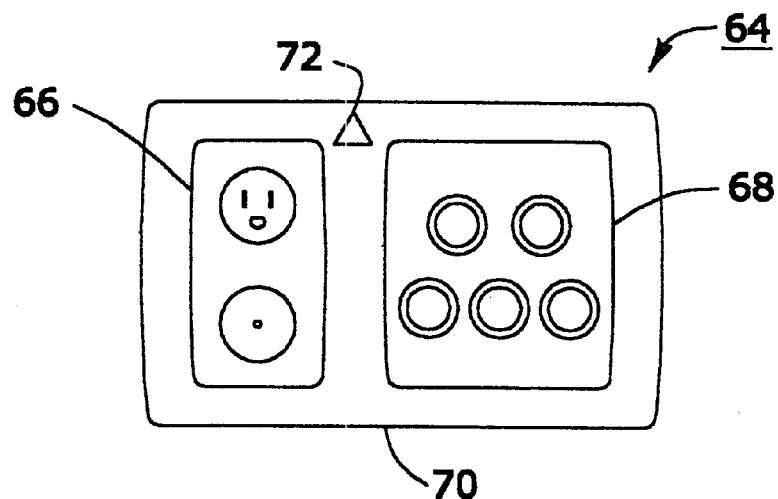
FIG. 2 is a front view of one of the service junctions arranged for receiving medically related utilities from an umbilicus.

The end wall 46 of the foot end 20 contains an oxygen bottle exchange port 60, a battery exchange port 62, and a service junction 64 (also shown in FIG. 2) containing electrical and fluid groups of receptor ports 66 and 68 surrounded by a common interlock component 70. The electrical group 66 contains ports for receiving electrical power and electronic communications. The fluid group 68 contains ports for receiving oxygen, anesthesia, air, suction, and water. The two groups of ports 66 and 68 are isolated from each other within the interlock component 70 to avoid exposing the medical gasses to inadvertent electrical discharges. A stretch resistant cable mounting 72 is also contained within the interlock component 70.

Figure 3:
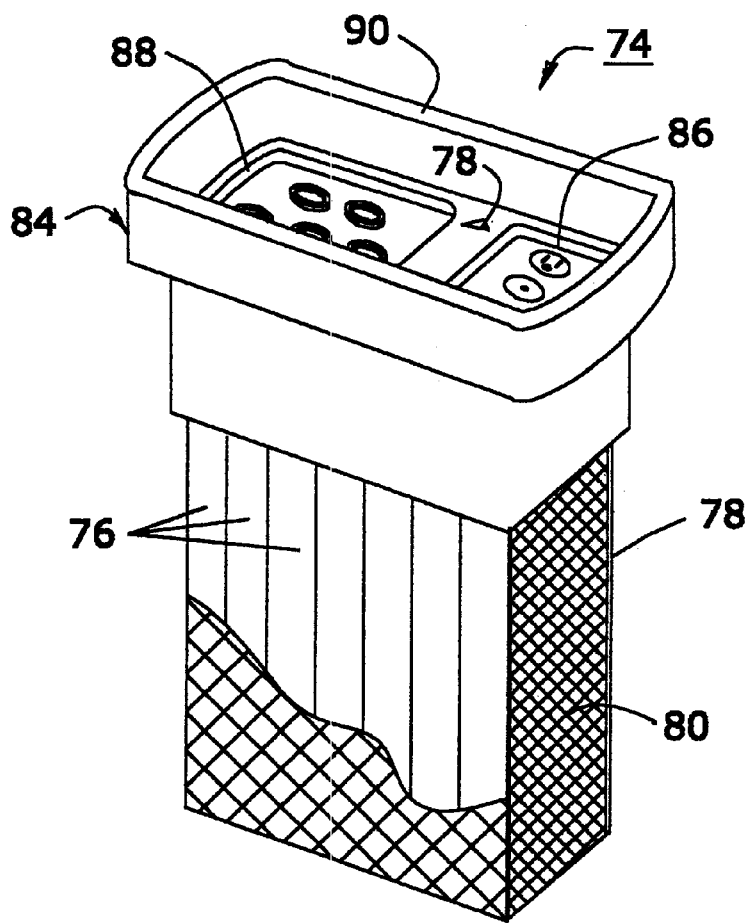
FIG. 3 is a broken away perspective view of one end of such an umbilicus.

The service junction 64 is adapted to receive electrical and medical fluid utilities through an umbilicus 74, which is partly shown in FIG. 3. The umbilicus 74 includes a plurality of medically related service lines 76 (i.e., wires and tubes) and a stretch resistant cable 78 bundled within a protective mesh sheath 80. Both ends of the umbilicus 74 terminate at heads 84, which are preferably identical. The heads 84 contain groups of electrical and fluid connector ports 86 and 88 that are arranged complementary to the electrical and fluid receptor ports 66 and 68 of the service junction 64. A surrounding interlock component 90 of one of the heads 84 mates with the interlock component 70 of the service junction 64 to form a shielded weatherproof seal.

Engagement of one of the heads 84 of the umbilicus 74 with the service junction 64 joins the electrical and fluid connector ports 86 and 88 with their corresponding electrical and fluid receptor ports of the service junction 64, and also joins the stretch resistant cable 78 of the umbilicus 74 with the cable mounting 72 of the service junction 64. Another head 84 at the opposite end (not shown) of the umbilicus 74 connects the umbilicus 74 to another similar service junction that is connected to a source of the medical utilities delivered through the umbilicus 74 to the treatment platform 10. Either of the heads 84 at opposite ends of the umbilicus 74 can also be disengaged from their respective service junctions.

The umbilicus connection at the foot end 20 of the platform 10 eliminates the need for lateral lines to extend from the platform and provides optimal patient treatment access for most types of medical and surgical procedures. The tasks of protecting, tracking, and maintaining the utility lines are simplified, and the unified connection of the lines saves time and facilitates computer monitoring of the connections.

Figure 4B:
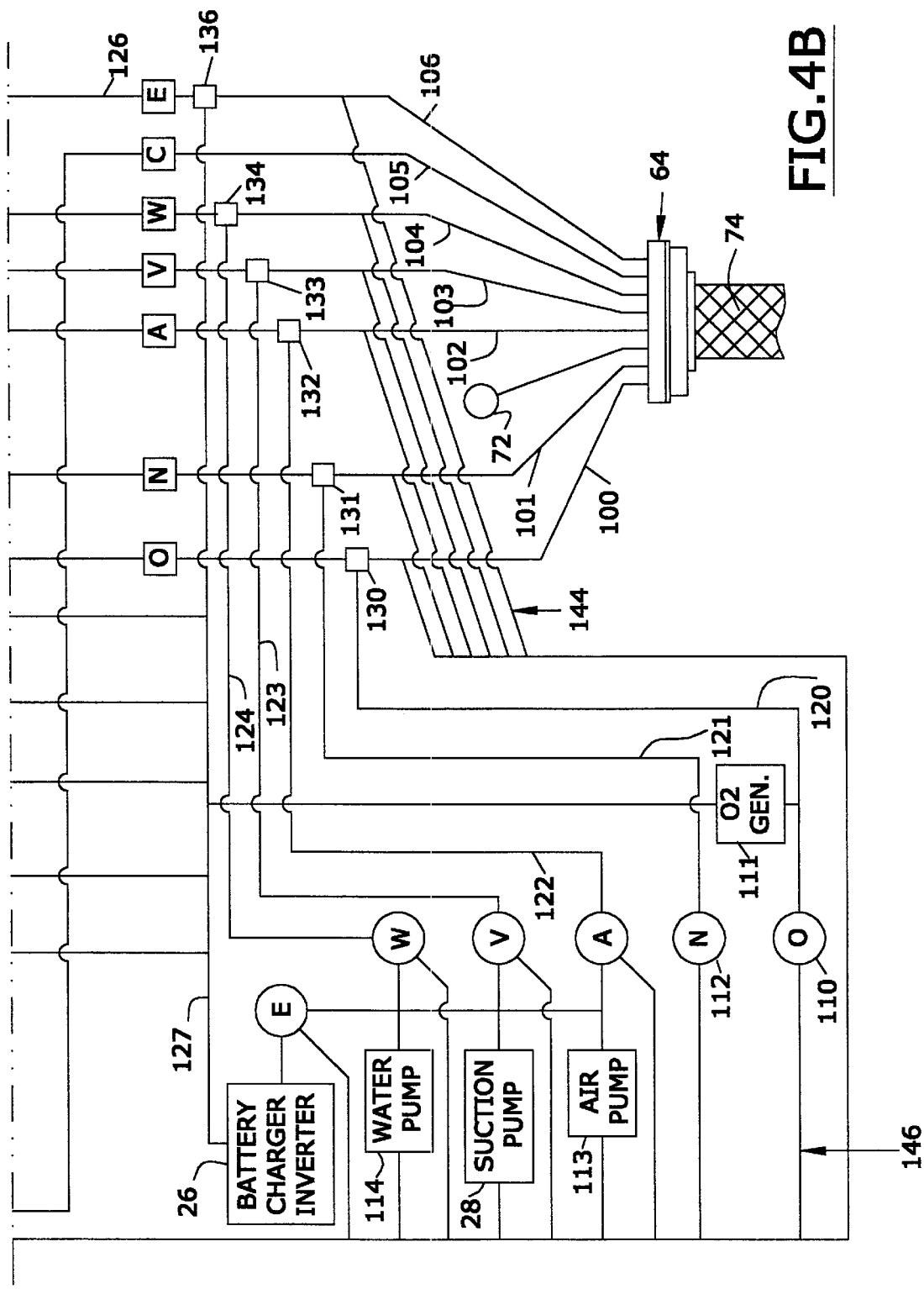
FIG. 4 is a diagram showing connections between the service junctions and the onboard equipment and supplies.

FIG. 4 exemplifies some of the relationships and interconnections among the onboard equipment and supplies and the two service junctions 54 and 64. Several lines emerge from the service junction 64. Fluid service lines 100, 101, 102, 103, and 104 convey medical fluids, namely, oxygen, anesthesia, compressed air, suction, and water. Electrical service lines 105 and 106 convey communications and electrical power, such as standard 120 volt electrical power. The stress relief cable mounting 72 is also depicted.

Except for communications, all of the depicted medically related utilities are also supplied onboard the platform 10. For example, oxygen is available from both oxygen canisters 110 and an oxygen generator 111. Anesthetic is also available from a canister 112. Compressed air is available from an air pump 113, suction from the suction pump 28, water from a water sump and pump 114, and electrical power from the inverter-charger and batteries 26. Fluid service lines 120, 121, 122, 123, and 124 from the onboard supplies join with the corresponding fluid service lines 100, 101, 102, 103, and 104 at directional valves 130, 131, 132, 133, and 134. An electrical junction 136 directs the offboard electrical power to the heating grid 38 and to a conventional electrical outlet 138 along an electrical line 126 and to the inverter-charger 26 along another electrical line 127. All five valves 130, 131, 132, 133, and 134 and the electrical junction 136 are monitored and controlled by a computer 140 and logic controller 142 through a set of control lines 144. The onboard supplies are similarly monitored and controlled through another set of control lines 146.

Several additional pieces of onboard equipment supporting the delivery of physiologic services to the patient are powered from either the offboard or onboard sources of electricity through the inverter-charger 26. These include the IV pump 30, the defibrillator 32, vital sign sensors 150, the respirator 24, and oxygen and suction regulators 152 and 154. Another set of control lines 156 communicates with the computer 140 and the logic controller 142 for monitoring and controlling operations of the additional equipment.

Five fluid service lines 160, 161, 162, 163, and 164 extend from the valves 130, 131, 132, 133, and 134 for conveying medical fluids from either onboard or offboard sources. The fluid service lines 160, 163, and 164 conveying oxygen, suction, and water connect to designated ports in the service junction 54. Oxygen and suction regulators 152 and 154 control flow rates through the fluid service lines 160 and 163. The fluid service line 160 carrying oxygen is also directed to the respirator 24, together with the fluid service lines 161 and 162 conveying anesthetic and compressed air. Output from the respirator 24 proceeds to either a designated port in the service junction 54 along line 165 or to a separate anesthetic port 158 along line 166. Two electrical service lines 167 and 168 from the defibrillator 32 and the vital sign sensors 150 and another fluid service line 169 from the IV pump 30 also proceed to the service junction 54. A control line 170 also returns to the computer 140 and logic controller 142 from the service junction 54 to monitor the condition and operation of the service junction 54.

In addition to receiving inputs from the various control lines 144, 146, 156, and 170, the computer 140 receives offboard communications through the communications line 105 and onboard communications through the touch-screen monitor 50. All of the usual other modes of entering computer data are also possible including keyboard, mouse, disk, scanning, and voice inputs. Preferably, the computer 140 holds the complete patient history, accumulates real-time data from the vital-sign sensors and resource utilization, and includes computer programs governing analysis, patient status, trending, and alarms. The communications line 105 also permits remote access to the data and potential control over on-board operations from remote sources.

Figure 5:
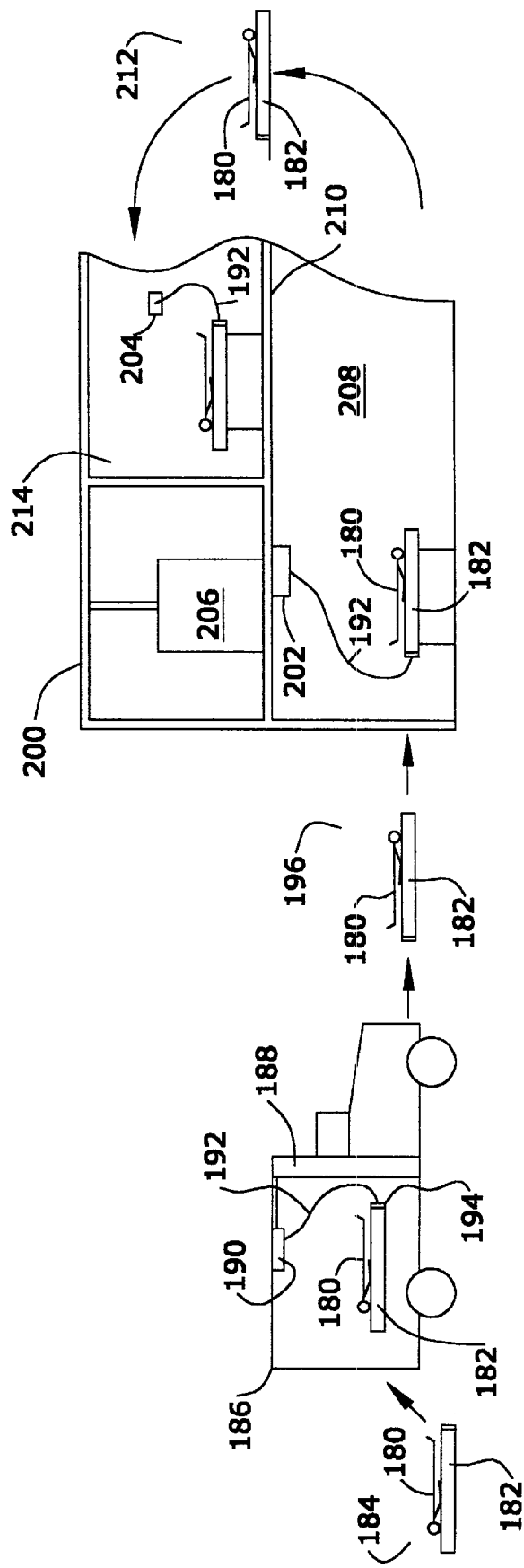
FIG. 5 is a diagram illustrating continuous care capabilities of our invention from a remote site to a fixed medical facility.

A progression of continuous care with uninterrupted services is shown in FIG. 5. A patient 180 is first treated on our continuous care platform 182 at a remote site 184 that is otherwise devoid of medical utilities. Treatment is started drawing on the medically related utilities carried onboard the continuous care platform. Treatment is continued within a mobile medical unit 186 having a supply of medically related utilities 188 available from a ceiling service junction 190. An umbilicus 192 connects a similar service junction 194 in the platform 182 to the ceiling service junction 190 to replace the utilities carried onboard the platform with the larger utility supply 188 in the mobile unit. The umbilicus connection between the ceiling service junction 190 and the platform service junction 194 provides the least obtrusion to patient care activities, which predominate at the patient head area and along both sides of the patient torso.

During patient transfer 196 from the mobile unit 186 to a fixed facility 200, the onboard utilities are again used to maintain continuity of services provided to the patient 180. A plurality of compatible service junctions 202 and 204 make available a central supply 206 of the medically related utilities throughout the fixed facility 200. For example, the same or a different umbilicus 192 can be used in a primary treatment room 206 to connect the continuous care platform 182 to the service junction 202 for transferring services from the onboard supply to the central supply 206.

Again, during an intra-facility patient transfer 212, the onboard utilities of the continuous care platform are called upon to sustain a constant level of care capability and an uninterrupted delivery of services. Upon reaching the new destination within the facility 200, such as an ongoing care room 214, the same or a different umbilicus 192 is used to connect the platform service junction 194 with the facility service junction 204.

Throughout this entire course of treatment, the onboard computer remains in attendance, making continuously available the patient history, status, and analysis of real-time data. Communication lines support remote monitoring, conferencing, and access to additional information sources and analysis. The complementary umbilicus and onboard supply channels, together with a standardized system of offboard service junctions, provide an unbroken chain of service continuity from the field to treatment specialties within fixed facilities.

We claim:

1. A system for delivering medically related utilities to a treatment platform from a plurality of different sites comprising:
   a treatment platform having an onboard service junction including an array of ports grouped together for receiving a plurality of medically related utilities;
   a plurality of offboard service junctions including arrays of ports grouped together for delivering the medically related utilities;
   said plurality of offboard service junctions being located at a plurality of different sites and being connected to a supply of the medically related utilities;
   at least one umbilicus containing a bundle of lines for conveying the medically related utilities and having a first head end that is engageable with said offboard service junctions for receiving the medically related utilities and a second head end that is engageable with said onboard service junction of the treatment platform for delivering the medically related utilities to said treatment platform; and
   at least one of said first and second head ends being disengageable from one of said service junctions and being engageable with another of said service junctions for supplying the same medically related utilities to the treatment platform from more than one of said plurality of different sites.

2. The system of claim 1 in which said first head end of the umbilicus is disengageable from said offboard service junction at one site and engageable with said offboard service junction at another site.

3. The system of claim 1 in which said second head end of a first umbilicus is disengageable from said onboard service junction of the treatment platform at one site, and said second head end of a second umbilicus is engageable with said onboard service junction of the treatment platform at another site.

4. The system of claim 1 in which said ports of the onboard service junction are grouped together and surrounded by an interlock.

5. The system of claim 4 in which said second head end of the umbilicus engages said interlock of the onboard service junction for simultaneously connecting said bundle of lines within the umbilicus to said array of ports within said interlock.

6. The system of claim 1 in which said ports of the offboard service junctions are grouped together and surrounded by interlocks.

7. The system of claim 6 in which said second head end of the umbilicus engages said interlock of the offboard service junctions for simultaneously connecting said bundle of lines within the umbilicus to said array of ports within the interlock.

8. The system of claim 1 in which said umbilicus contains separate lines for conveying medical gases and electrical power.

9. The system of claim 8 in which said separate lines also convey communications.

10. The system of claim 1 in which said offboard service junctions are located in a common fixed facility, and said offboard service junctions are standardized within the fixed facility so that the first head end of the umbilicus is engageable with all of the standardized offboard service junctions.

11. The system of claim 10 in which said offboard service junctions are located in a common mobile facility, and said offboard service junctions are standardized within the mobile facility so that the first head end of the umbilicus is engageable with all of the standardized offboard service junctions in both the fixed facility and the mobile facility.

12. A system for delivering continuous care to a patient from a plurality of different sites comprising:
   a mobile treatment platform for transporting the patient;
   an umbilicus containing a bundle of lines that extend bundled together through a distance from said mobile treatment platform for conveying medically related utilities from an offboard supply to said mobile treatment platform;
   a plurality of offboard service junctions including arrays of ports grouped together for delivering the medically related utilities;
   said plurality of offboard service junctions being located at a plurality of different sites and being connected to at least one offboard supply of the medically related utilities; and
   said umbilicus having a head end that is:
      (a) engageable with one of said offboard service junctions for connecting said mobile treatment platform to the at least one offboard supply of medically related utilities,
      (b) disengageable from one of said offboard service junctions for interrupting the connection between said mobile treatment platform and the at least one offboard supply of medically related utilities, and
      (c) engageable with another of said offboard service junctions for connecting said mobile treatment platform to the at least one offboard supply of medically related utilities from more than one of the plurality of different sites.

13. The system of claim 12 in which the ports of said offboard service junctions are grouped together and surrounded by interlocks.

14. The system of claim 13 in which the head end of said umbilicus is engageable with the interlocks of said offboard service junctions for simultaneously connecting the bundle of lines within said umbilicus to the arrays of ports within the interlocks.

15. The system of claim 12 in which said umbilicus includes among its bundle of lines at least one tube for conveying a medical gas from the at least one offboard supply of medically related utilities to said mobile treatment platform.

16. The system of claim 15 in which said umbilicus contains separate lines for conveying medical gases and electrical power.

17. The system of claim 16 in which the separate lines also convey communications.

18. The system of claim 12 in which said offboard service junctions are located in a common fixed facility, and said offboard service junctions are standardized within the fixed facility so that the head end of said umbilicus is engageable with all of the standardized offboard service junctions.

19. The system of claim 18 in which at least one of said offboard service junctions is also located in a mobile facility, and said offboard service junction within the mobile facility is standardized so that the head end of said umbilicus is engageable with the standardized offboard service junctions in both the fixed facility and the mobile facility.

20. The system of claim 12 in which said umbilicus including its bundle of lines is flexible.

21. The system of claim 20 in which said umbilicus includes a reinforcement that prevents the bundle of lines from being overextended during use.

22. The system of claim 20 in which the reinforcement includes a sheath that surrounds the bundle of lines.

23. The system of claim 12 further comprising a supply of onboard medically related utilities and a switching system for supplying the patient with similar medically related utilities from either the onboard supply or the at least one offboard supply of medically related utilities.

24. The system of claim 23 in which the switching system includes a system of valving.

25. A method of delivering continuous care to a patient from a plurality of different sites comprising the steps of:
  mounting the patient on a mobile treatment platform having an umbilicus containing a bundle of lines that are extendable through a distance together from the mobile treatment platform for conveying medically related utilities from an offboard supply to the mobile treatment platform;
  transporting the patient on the mobile treatment platform through a succession of different sites containing offboard service junctions that are connected to at least one offboard supply of the medically related utilities;
  engaging a head end of the umbilicus with one of the offboard service junctions for connecting the mobile treatment platform to the at least one offboard supply of medically related utilities;
  disengaging the head end of the umbilicus from one of the offboard service junctions for interrupting the connection between the mobile treatment platform and the at least one offboard supply of medically related utilities; and
  engaging the head end of the umbilicus with another of the offboard service junctions for connecting the mobile treatment platform to the at least one offboard supply of medically related utilities from more than one of the different sites.

26. The method of claim 25 in which the steps of engaging include connecting the mobile treatment platform to a supply of medical gas through the umbilicus.

27. The method of claim 26 in which the steps of engaging also include connecting the mobile treatment platform to a supply of electricity through the umbilicus.

28. The method of claim 27 in which the steps of engaging also include connecting the mobile treatment platform to a system of communication through the umbilicus.

29. The method of claim 25 in which the steps of engaging include engaging the head end of the umbilicus with arrays of ports surrounded by interlocks.

30. The method of claim 25 in which the steps of engaging include extending the umbilicus through a distance from the mobile treatment platform for connecting the bundle of lines to the offboard service junctions.

31. The method of claim 25 including a further step of standardizing the offboard service junctions within a fixed facility so that the head end of the umbilicus is engageable with all of the standardized offboard service junctions within the fixed facility.

32. The method of claim 31 including a further step of standardizing at least one of the offboard service junctions in a mobile facility so that the head end of the umbilicus is engageable with the standardized offboard service junctions in both the fixed facility and the mobile facility.

33. The method of claim 25 including further steps of providing an onboard supply of medically related utilities and switching between the onboard supply of medically related utilities and the at least one offboard supply of medically related utilities to provide the patient with a more continuous supply of the medically related utilities between the steps of engaging and disengaging the head end of the umbilicus.

34. The method of claim 33 in which the step of switching includes operating valves for opening patient access to the onboard supply of medically related utilities and closing patient access to the at least one offboard supply of medically related utilities associated with the step of disengaging the head end of the umbilicus.

35. The method of claim 34 in which the step of switching includes operating the valves for opening patient access to the at least one offboard supply of medically related utilities and closing patient access to the onboard supply of medically related utilities associated with the steps of engaging the head end of the umbilicus.

36. A method of delivering continuous care to a patient from a plurality of different sites comprising the steps of:
  mounting the patient on a mobile treatment platform having an onboard service junction including an array of ports grouped together for receiving a plurality of medically related utilities;
  transporting a patient on the mobile treatment platform through a succession of different sites containing offboard service junctions that are connected to at least one offboard supply of the medically related utilities;
  providing at least one umbilicus containing a bundle of lines that are extendable through a distance together between the onboard service junction and the offboard service junctions at the different sites;
  connecting the at least one umbilicus between the onboard service junction and the offboard service junction at one of the sites for delivering medical utilities to the patient from the at least one offboard supply of medically related utilities;
  disconnecting the at least one umbilicus between the onboard service junction and the offboard service junction at the one site for interrupting the delivery of medical utilities to the patient from the at least one offboard supply of medically related utilities; and
  connecting the at least one umbilicus between the onboard service junction and the offboard service junction at another of the sites for reestablishing delivery of medical utilities to the patient from the at least one offboard supply of medically related utilities.

37. The method of claim 36 in which the steps of connecting include engaging a head end of the at least one umbilicus with one of the onboard and offboard service junctions.

38. The method of claim 36 in which the steps of connecting include engaging a head end of the at least one umbilicus with the onboard service junction.

39. The method of claim 36 in which the steps of connecting include connecting the mobile treatment platform to a supply of medical gas through the umbilicus.

40. The method of claim 39 in which the steps of connecting also include connecting the mobile treatment platform to a supply of electricity through the umbilicus.

41. The method of claim 40 in which the steps of connecting also include connecting the mobile treatment platform to a system of communication through the umbilicus.

42. The method of claim 36 including further steps of providing an onboard supply of medically related utilities and switching between the onboard supply of medically related utilities and the at least one offboard supply of medically related utilities to provide the patient with a more continuous supply of the medically related utilities between the steps of connecting and disconnecting the umbilicus.

43. The method of claim 42 in which the step of switching includes operating valves for opening patient access to the onboard supply of medically related utilities and closing patient access to the at least one offboard supply of medically related utilities associated with the step of disconnecting the umbilicus.

44. The method of claim 43 in which the step of switching includes operating the valves for opening patient access to the at least one offboard supply of medically related utilities and closing patient access to the onboard supply of medically related utilities associated with the steps of connecting the umbilicus.

* * * * *